No. 812,748. PATENTED FEB. 13, 1906.
J. W. IPPERS.
PHOTOGRAPHY.
APPLICATION FILED SEPT. 9, 1905.

2 SHEETS—SHEET 1.

Witnesses:
Chas. D. King.
Henry L. Peckard

Inventor:
John W. Ippers.
by Albert H. Walker, Atty.

No. 812,748. PATENTED FEB. 13, 1906.
J. W. IPPERS.
PHOTOGRAPHY.
APPLICATION FILED SEPT. 9, 1905.

2 SHEETS—SHEET 2.

UNITED STATES PATENT OFFICE.

JOHN W. IPPERS, OF NEW YORK, N. Y., ASSIGNOR TO ALBERT HENRY WALKER, TRUSTEE, OF NEW YORK, N. Y.

PHOTOGRAPHY.

No. 812,748.　　　Specification of Letters Patent.　　Patented Feb. 13, 1906.

Application filed September 9, 1905. Serial No. 277,659.

*To all whom it may concern:*

Be it known that I, JOHN W. IPPERS, a citizen of the United States, and a resident of the city of New York and State of New York, have invented certain new and useful Improvements in Photography, of which the following description and claims constitute the specification.

This invention comprises a photographic process and a resulting photograph.

Figure 1:
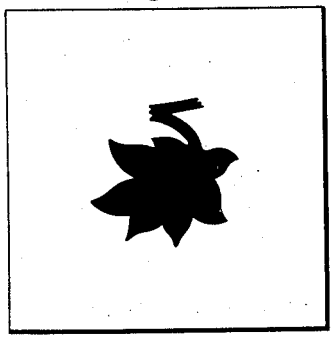
Figure 2:
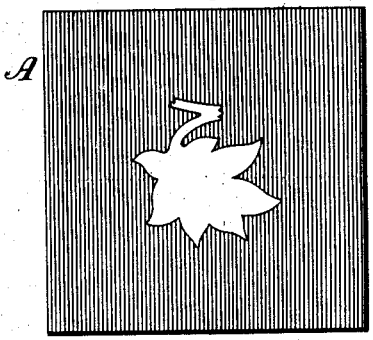
Figure 3:
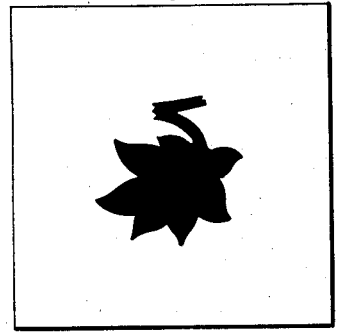
Figure 4:
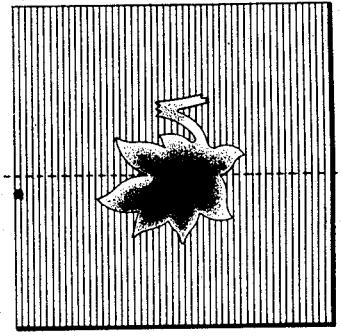
Figure 5:
Figure 6:
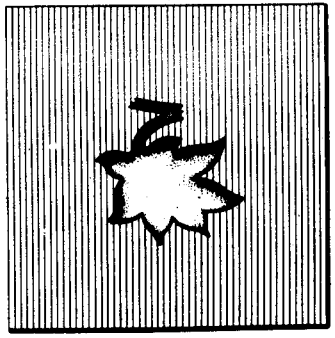
Figure 7:
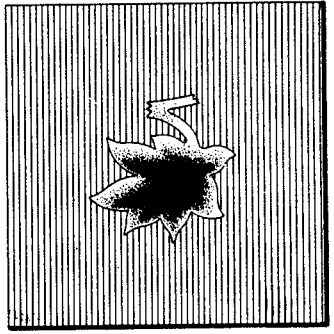
Figure 8:
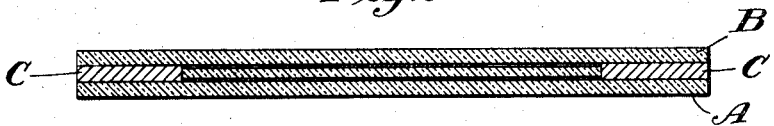
Figure 9:
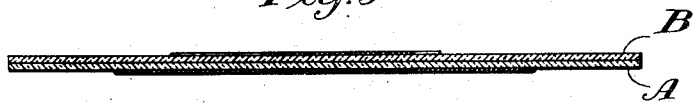
Figure 10:
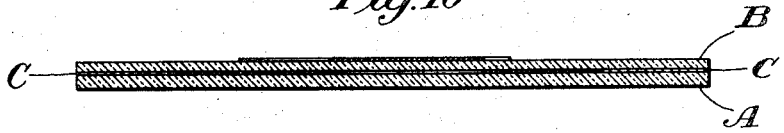

Figure 1 is a flat drawing of a leaf made in very black ink and on very white cardboard. Fig. 2 represents a negative photograph on glass made in a camera from the drawing of Fig. 1. The leaf on that glass negative is clear, but it is not quite absolutely transparent, for it intercepts a very small proportion of the light which reaches it. The field of that negative is tinted, but it is translucent enough to transmit a large proportion of whatever light may strike it, and which proportion may be one-third or more of the whole. Fig. 3 represents a positive photograph on glass made from the glass negative of Fig. 2. The leaf on that positive is as entirely opaque as possible, while its field is as perfectly transparent as possible. Fig. 4 is a view which represents a particular appearance of a compound translucent photograph composed of the negative of Fig. 2 and the positive of Fig. 3 fastened flatwise together with an effective distance between them and with the photographic films of the negative and the positive opposite to each other and with the clear leaf of the negative in accurate registration with the opaque leaf of the positive. That particular appearance of the compound photograph is presented when the negative side of the compound photograph is held opposite to the eyes and its positive side is held opposite to a wall below a window and when the light coming through the window is not too strong. Fig. 5 is a horizontal section on the dotted line and on an enlarged scale of Fig. 4. Fig. 6 is a representation of an intaglio or negative photograph on glass made in a camera, as hereinafter indicated, form the compound photograph of Figs. 4 and 5. Fig. 7 is a view of a relief or positive photograph on glass or on paper made in a photographic-printing frame or in a camera from the glass intaglio photograph of Fig. 6. The tinted fields of the photographs of Figs. 6 and 7 when they are on glass are translucent enough to transmit about half of whatever light may seek to pass through them. Figs. 8, 9, and 10 are horizontal sections of modified forms of the compound photograph of Fig. 4.

The new process of this invention is involved in each of several somewhat variant programs. I will now describe in detail the particular program which is illustrated by the drawings.

Whatever design is to be the subject of a relief or an intaglio photograph is first made in deep ungraduated black on very white cardboard, the particular design shown in the drawings being a leaf. The negative-glass photograph of Fig. 2 is made in the usual way from that drawing in any good camera, and the degree of clearness of its leaf and of the tinted translucency of its field are produced by means which are well known to photographers for producing those results. The positive-glass photograph of Fig. 3 is made in the usual way in a photographic-printing frame from the glass negative of Fig. 2, and the deep opacity of its leaf and the high transparency of its field are also produced by well-known means. Those dry plates which are known as "contrast" plates on account of the fact that they can be developed into photographs showing strong contrasts are suitable for making the photograph of Fig. 2 and also that of Fig. 3 in different methods of exposure and development, according as the dark part of the photograph is to be quite opaque, as in Fig. 3, or is to be tinted and translucent, as in Fig. 2.

The compound photograph of Fig. 4 is composed by uniting the negative photograph A of Fig. 2 with the positive photograph B of Fig. 3, with an air-space between them. This union is effected by holding the positive photograph B in the position shown in Fig. 3 and by pasting or gluing strips of pasteboard C, about one-sixteenth of an inch thick, to its borders and by turning the negative photograph A over upon its left-hand edge, as upon a hinge, and pasting or gluing its borders down upon the pasteboard strips in such a position that the clear leaf of the negative photograph A will register with the opaque leaf of the positive photograph B. The union of the two photographs may be made permanent by binding their edges and the edges of the pasteboard strips with cloth pasted or glued to their borders.

The compound photograph of Figs. 4 and 5 is a new article of manufacture, having a new mode of operation and a new function. Its peculiar characteristics are due to the distance between the films of its two parts. That distance may be occupied by air only, as in Fig. 5, or it may be occupied by glass or other transparent material; but I prefer air to glass in that place. Where glass occupies that distance, it may consist of a plain sheet of glass inserted between the negative A and the positive B, as in Fig. 8, or it may consist of the glass bases of the negative A and the positive B when the films thereof are on their outsides, as in Fig. 9, instead of on their insides, or it may sometimes consist of one of those bases without the other when one of the films is between the two bases and the other film is on the outside of its base, as in Fig. 10.

The peculiar characteristics of the compound photograph of Figs. 4 and 5 can be seen by holding it vertically at arm's length in a room moderately lighted from one side and between the eyes and a wall of that room which is under its window and with its positive side turned toward that wall. In this position light coming through the window reaches the positive side of the compound photograph somewhat diagonally from above and causes the opaque leaf thereon to cast a shadow on the negative part, which shadow falls wholly or mainly upon the clear leaf of the negative part; but that shadow does not register with the clear leaf of the negative part and its boundaries are graduated and indefinite. Those portions of the clear leaf of the negative part which are not covered by that shadow appear to be light, while that portion which is covered by that shadow is variably dark in appearance and the borders of the shadow gradually lighten off into the light of the clear leaf of the negative part of the compound photograph. That photograph can be held in such a position and such a light as that the shadow cast by the opaque leaf of its positive part will appear to fall entirely within the clear leaf of its negative part, and that is the fact in respect of the specimen represented by Fig. 4, or the compound photograph can be held in such a position and such a light as that the shadow of the opaque leaf of its positive part, while falling mainly on the clear leaf of its negative part, will lap over upon the tinted field of its negative part. In either case that shadow combines with the clear leaf and with the tinted areas of the negative part of the compound photograph to present the appearance of a relief photograph, and the relief effect is rounded and artistic instead of being sharp and mechanical, as it would be if the two parts of the compound photograph had no distance between their films, even if they had been fixed together out of registry with each other.

The peculiar rounded and artistic relief effect which appears in the compound photograph of Figs. 4 and 5 when it is viewed as above described cannot be reproduced by any drawing made in deep black with a pen, as Patent Office drawings must be made. Therefore Fig. 4 is said to represent the appearance of my compound photograph and is not said to reproduce that appearance. The graduated black dots on the leaf of Fig. 4 represent graduated structureless gray on the leaf of my compound photograph, and the definitely-outlined but indefinitely inwardly extending white border of the leaf of Fig. 4 represents a graduated structureless light tint on the border of the leaf of that photograph. That structureless gray and that structureless light tint combine to constitute a beautiful and softly rounded relief effect in my compound photograph.

The intaglio glass photograph of Fig. 6 may be made in a camera from the compound photograph of Figs. 4 and 5 in the following manner: A camera is placed in the middle of a room, which is moderately lighted only at one side through a vertical window and with the axis of the camera pointing toward the outer wall of the room just below that window. The compound photograph of Figs. 4 and 5 is placed between the camera and the wall, with its negative side A next to the camera and with its positive side B opposite to the wall. A photographic plate in the camera is then exposed to light coming from the compound photograph of Fig. 4. The result of that exposure is the potential production on that exposed photographic plate of the intaglio negative photograph of Fig. 6 and that potential production is developed into actuality in the usual method of developing exposed photographic plates.

The intaglio negative photograph of Fig. 6 results from the exposure of the photographic plate in the camera to light coming from the compound photograph of Figs. 4 and 5, because the shadow cast by the opaque leaf of the positive part of that photograph upon the clear leaf of its negative part is photographed, together with the unshadowed border of that clear leaf, upon the exposed plate in the camera, and the resulting intaglio effect is rounded and artistic instead of being sharp and mechanical, because the edges of that shadow are indefinite and modulated instead of being abrupt and sharply defined.

The relief or positive photograph of Fig. 7 may be made on paper or on glass in a photographic-printing frame or in a camera from the intaglio or negative photograph of Fig. 6. That relief or positive photograph is one form of the result of my process. Another form of that result is an intaglio or negative photograph, which can be made in a photographic-printing frame from a relief or positive photograph of Fig. 7, if the latter is made on glass. Such an intaglio or negative photograph on paper is well represented by Fig. 6, with the understanding that the tinted field of that figure is thought of as representing the tinted field of a paper photograph instead of representing the tinted field of a glass photograph, as it primarily does.

The shadow cast by the opaque area of the positive part of the compound photograph upon its negative part and the consequent result of my process can be varied by varying the direction and the strength of the light which falls upon the rear side of the compound photograph during the exposure thereto of the photographic plate in the camera and also by varying the direction and the strength of the light between the compound plate and the camera; but the light which falls upon the rear of the compound plate must not come directly from the sun and must not come directly from the sky except when the sky is gray, and the light between the compound photograph and the camera must be weaker than the light which falls upon the rear of that photograph. Both these areas of light may be composed of reflected rays or of diffused rays of light and many beautiful variations of result may be attained by means of screens arranged near the compound photograph and adapted by their various combinations of positions to vary the lights and shadows in and on the compound photograph.

Registration between the two parts of my compound photograph is not essential to its character nor necessary to my process or to its ultimate result, for that result can be attained when those parts are somewhat out of registration; but in that case the lighting will require modified management or the result will be somewhat modified in respect of the strength and the direction of the shadow cast by the opaque area of the positive part of the compound photograph upon its negative part and in respect of the particular appearance of the relief or the intaglio of the ultimate photograph which results from the process.

Deviation from registration between the two parts of my compound photograph is not essential to its character nor necessary to my process or to its ultimate result, for that result cannot be attained by such deviation alone nor be defeated by its absence. That result is dependent upon distance between the films of the two parts of my compound photograph and is not dependent upon registration or upon deviation from registration between the opaque areas of the positive part and the clear areas of the negative part of that photograph.

The width of the necessary distance between the films of the two parts of my compound photograph should be made to vary with varying circumstances, such as varying widths of the elements of the original drawing from which the negative part of that compound photograph is made. Good results will generally be obtained where that distance is about as great as the thickness of the glass of the photographic plates which compose the compound photograph, and which plates are generally about one-sixteenth of an inch thick. The distance in question must be great enough to enable the diffused light therein to enter the edges of the shadow which passes therethrough from the opaque area of the positive part of the compound photograph to the clear area of the negative part thereof, and thus to make the outlines of that shadow appear graduated and indefinite upon the negative side of that photograph; but that distance must not be great enough to cause that diffused light to so far dissipate that shadow as to prevent it from producing its modulated effect upon the negative side of the photograph. Any distance which falls within these limits is suitable, and I define that suitable distance by specifying it as an "effective distance," meaning thereby such a distance as will result in making the outlines of the shadow graduated and indefinite without dissipating the shadow entirely. The particular effective distance for each case can be ascertained by experiment with the negative and the positive photographs which are to be united with an effective distance between them. Having stated the principles on which that ascertainment depends, I do not think it necessary to confine my specification or my claims to any exact limit in this respect; but I think that one thirty-second of an inch is too little and that one-quarter of an inch is too large a distance between the two parts of my compound photograph except in unusual cases.

This invention is particularly applicable to photography as photography is embodied in photomechanical printing. For example, a drawing may be made in black ink on white cardboard to contain the single leaf of Fig. 1 in connection with enough other leaves and vines to constitute a design which if multiplied will be available for printing on silk or cotton fabric of a standard width and of an indefinite length. Then the supposed drawing may be thus multiplied, photographically or otherwise, enough times to enable its resulting length to conform to the width of the fabric to be printed and to enable its resulting width to conform to the circumference of a copper roller, which is to be used in printing that fabric. Thereupon that drawing may be treated as this specification directs the drawing of Fig. 1 to be treated, as as far as the production of the relief photograph of Fig. 7. That relief photograph may then be used in the production of a developed gelatin plate, according to my Patent No. 785,735, of March 28, 1905, and that developed gelatin plate may then be used according to the same patent in the production of an etched copper roller, and that etched copper roller may then be used according to the same patent to print a reproduction or a representation of the said multiplied relief design on an indefinitely-long strip of silk or cotton cloth once for each revolution of the copper roller. Moreover, if that long strip of cloth is also to be printed with a background in a different color from that of the relief design that double printing can be effected from the said multiplied drawing, according to the process of the Reckard patent, No. 794,551, of July 11, 1905.

A variation of the above-described program of making the compound photograph of Figs. 4 and 5 consists in beginning with a drawing like that of Fig. 1, except in having its leaf white and its ground black. In that case the first step consists in making the photograph of Fig. 3 from that drawing, and the next step consists in making the photograph of Fig. 2 from the photograph of Fig. 3. When thus made, the photograph of Fig. 3 may be called a negative instead of a positive, and the photograph of Fig. 2 may be called a positive instead of a negative; but the characters of the two photographs will be the same as if that of Fig. 2 had been made from the drawing of Fig. 1 and as if that of Fig. 3 had been made from the photograph Fig. 2, and the two photographs will be united into the compound photograph of Figs. 4 and 5 in the same way as if they had been made in the order of their numbers.

Whether the photographs of Figs. 2 and 3 are made in one order or the other and whichever of them is called a "positive" while the other is called a "negative" photograph they are always distinguishable by the fact that the opaque area of the photograph of Fig. 3 is much darker than the darkest area of the photograph of Fig. 2. For this reason such photographs are specified in the following claims as a "dense" photograph and a "thin" photograph, respectively.

I claim as my invention—

1. The following process in photography: making a thin photograph, having a tinted area and a clear area: making a counterpart dense photograph, having a clear area and an opaque area: uniting those photographs into one structure, with their films separated by an effective distance, and with the clear area of its thin part, opposite to the opaque area of its dense part: placing and holding that compound photograph before a camera, with its thin side nearest the camera, and with its dense side exposed to moderate light, but shielded from direct sunlight and from excessive light: exposing a photographic plate in the camera, to subdued light coming from that compound photograph: developing that exposed plate into an intaglio photograph: and making a relief photograph from that developed intaglio photograph; all substantially as described.

2. The following process in photography: making a thin photograph, having a tinted area and a clear area: making a counterpart dense photograph, having a clear area and an opaque area: uniting those photographs into one structure, with their films separated by an effective distance, and with the clear area of its thin part opposite to the opaque area of its dense part: placing and holding that compound photograph before a camera, with its thin side nearest the camera, and with its dense side exposed to moderate light, but shielded from direct sunlight and from excessive light: exposing a photographic plate in the camera, to subdued light coming from that compound photograph; and developing that exposed plate into an intaglio photograph; all substantially as described.

3. A compound photograph: composed of a thin photograph having a tinted area and a clear area, and of a counterpart dense photograph, having a clear area and an opaque area; the two photographs being placed flatwise together, with the clear area of the thin photograph opposite to the opaque area of the dense photograph, and with the films of the two parts of the compound photograph separated by an effective distance; all substantially as described.

JOHN W. IPPERS.

Witnesses:
ALBERT H. WALKER,
HENRY L. RECKARD.